United States Patent
Rothman et al.

(10) Patent No.: US 7,774,846 B2
(45) Date of Patent: Aug. 10, 2010

(54) METHOD AND APPARATUS FOR CONTROLLING DATA PROPAGATION

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 1397 days.

(21) Appl. No.: 11/201,449

(22) Filed: Aug. 10, 2005

(65) Prior Publication Data

US 2007/0036075 A1 Feb. 15, 2007

(51) Int. Cl.
G06F 11/00 (2006.01)
G06F 12/14 (2006.01)
G06F 13/00 (2006.01)
G08B 23/00 (2006.01)

(52) U.S. Cl. .......................... 726/24; 713/150
(58) Field of Classification Search .................. 726/24; 715/15

See application file for complete search history.

(56) References Cited

U.S. PATENT DOCUMENTS

| | | | | |
|---|---|---|---|---|
| 6,313,878 | B1* | 11/2001 | Jankowiak | 348/377 |
| 6,560,711 | B1* | 5/2003 | Given et al. | 726/34 |
| 6,799,209 | B1* | 9/2004 | Hayton | 709/223 |
| 2003/0131258 | A1* | 7/2003 | Kadri | 713/201 |
| 2003/0212901 | A1* | 11/2003 | Mishra et al. | 713/200 |
| 2004/0181811 | A1* | 9/2004 | Rakib | 725/122 |
| 2005/0091338 | A1* | 4/2005 | de la Huerga | 709/217 |
| 2007/0258437 | A1* | 11/2007 | Bennett | 370/352 |
| 2009/0178141 | A1* | 7/2009 | Panasyuk | 726/24 |

* cited by examiner

*Primary Examiner*—Farid Homayounmehr
(74) *Attorney, Agent, or Firm*—Trop, Pruner & Hu, P.C.

(57) ABSTRACT

A filter driver or other control logic automatically monitors user input events and outbound network packets in a processing system. According to one embodiment, in response to detecting an outbound network packet, the filter driver automatically determines whether the outbound network packet corresponds to a recent user input event. If the outbound network packet does not correspond to at least one recent user input event, the filter driver automatically prevents the processing system from transmitting the outbound network packet. Other embodiments are described and claimed.

16 Claims, 2 Drawing Sheets

METHOD AND APPARATUS FOR CONTROLLING DATA PROPAGATION

FIELD OF THE INVENTION

The present disclosure relates generally to the field of data processing, and more particularly to methods and related apparatus for controlling data propagation.

BACKGROUND

A conventional processing system may include hardware resources, such as a central processing unit (CPU) and random access memory (RAM), as well as software resources, such as an operating system (OS) and one or more end-user programs or applications. Some of the most common end-user applications are email applications and web browser applications. Such applications allow users with different data processing systems to share information with each other via networks, such as the Internet.

The information technology (IT) infrastructure in many parts of the world has advanced to the stage that it now supports international communication through applications such as email clients, web browsers, and instant messaging (IM) programs. Unfortunately, some individuals have developed, and continue to develop, viruses, worms, and other types of software which interfere with such communications, which adversely affect the data processing systems used for such communications, or both. For purposes of the disclosure the term "virus" is used in general to refer to viruses, worms, and any other related type of software.

A conventional approach to combating viruses involves software that scans the data that comes in to a data processing system, and compares that data against a predefined list of known viruses or virus signatures. If certain attributes of the incoming data match the attributes of a virus on the list of known viruses, remedial measures are taken. One disadvantage of this conventional approach, however, is that it does not protect against viruses that aren't in the list. The data processing system therefore remains susceptible to new viruses, until such time as the attributes of the new viruses are discovered, and the list of known viruses is updated accordingly.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
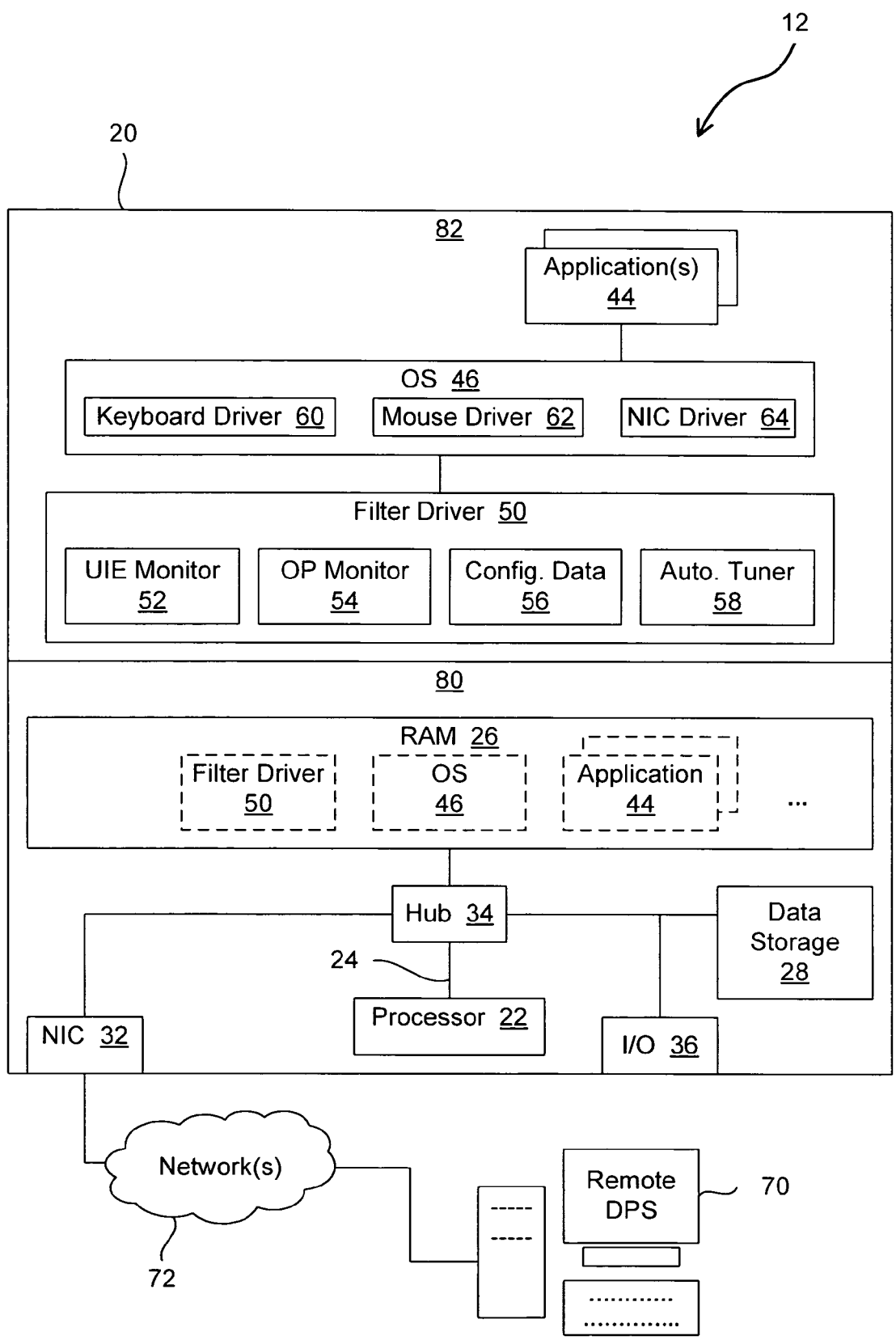
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that includes various hardware components 80 and software components 82. The hardware components may include, for example, one or more processors or central processing units (CPUs) 22 communicatively coupled to various other components via one or more system buses 24 or other communication pathways or mediums.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablets, telephones, personal digital assistants (PDAs), handheld devices, entertainment devices such as audio and/or video devices, and other devices for processing or transmitting information.

Processing system 20 may be controlled, at least in part, by input from conventional input devices, such as a keyboard, a pointing device such as a mouse, etc. Processing system 20 may also respond to directives received from other processing systems or other input sources or signals. Processing system 20 may utilize one or more connections to one or more remote data processing systems 70, for example through a network interface controller (NIC) 32, a modem, or other communication ports or couplings. Processing systems may be interconnected by way of a physical and/or logical network 72, such as a local area network (LAN), a wide area network (WAN), an intranet, the Internet, etc. Communications involving network 72 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Within processing system 20, processor 22 may be communicatively coupled to one or more volatile or non-volatile data storage devices, such as random access memory (RAM) 26, read-only memory (ROM), mass storage devices 28 such as integrated drive electronics (IDE) or small computer system interface (SCSI) hard drives, and/or other devices or media, such as floppy disks, optical storage, tapes, flash memory, memory sticks, digital video disks, biological storage, etc. For purposes of this disclosure, the term "ROM" may be used in general to refer to non-volatile memory devices such as erasable programmable ROM (EPROM), electrically erasable programmable ROM (EEPROM), flash ROM, flash memory, etc. Processor 22 may also be communicatively coupled to additional components, such as video controllers, SCSI controllers, network controllers, universal serial bus (USB) controllers, input devices such as a keyboard and a mouse, etc. Processing system 20 may also include one or more bridges or hubs 34, such as a memory controller hub, an input/output (I/O) controller hub, a PCI root bridge, etc., for communicatively coupling system components. As used herein, the term "bus" includes pathways that may be shared by more then two devices, as well as point-to-point pathways.

Some components, such as NIC 43, for example, may be implemented as adapter cards with interfaces (e.g., a PCI connector) for communicating with a bus. Some devices may be implemented as embedded controllers, using components such as programmable or non-programmable logic devices or arrays, application-specific integrated circuits (ASICs), embedded computers, smart cards, and the like.

The invention is described herein with reference to or in conjunction with data such as instructions, functions, procedures, data structures, application programs, configuration settings, etc. When the data is accessed by a machine, the machine may respond by performing tasks, defining abstract data types or low-level hardware contexts, and/or performing other operations, as described in greater detail below. The data may be stored in volatile and/or non-volatile data storage.

For instance, data storage device 28 may include various sets of instructions which, when loaded into RAM 26, which is an example of a non-transitory machine accessible storage medium, and executed, perform various operations. The sets of instructions may be referred to in general as applications, modules, drivers, etc. For purposes of this disclosure, the term "program" is used in general to cover a broad range of software constructs, including applications, modules, drivers, subprograms, and other types of software components.

As illustrated in FIG. 1, in the example embodiment the programs or software components 82 may include an operating system (OS) 46 and applications 44, such as an email client, a web browser, an instant messaging (IM) client, office productivity programs, games, etc. OS 46 may include various drivers to facilitate communication between OS 46 and the hardware components 80 of processing system 20. Those drivers may include a keyboard driver 60, a mouse driver 62, a NIC driver 64, etc. Many of applications 44 may enable processing system 20 to send data to other processing systems.

In conventional systems, viruses are often spread by data processing systems that transmit infected files to other data processing systems. The infected files may be files that contain the code for the virus itself, or files that contain links or pointers to that code, for example.

In one example, a virus in an infected system may extract email addresses from a data file associated with an email client on that system. Then, unbeknownst to the user of the infected system, the virus may generate new infected email messages, and may email those messages to numerous other processing systems. Other propagation strategies may be used by other types of viruses. Nevertheless, the propagation strategies for many types of viruses involve the transmission of infected files or other harmful data from an infected system.

As described in greater detail below, in the example embodiment, processing system 20 includes control logic for automatically controlling the transmission of data from processing system 20, based on factors such as whether or not the outgoing data was (or was likely to have been) generated in response user input.

In the example embodiment, this software for controlling data propagation is implemented as a filter driver 50. As described in greater detail below, in the example embodiment, filter driver 50 includes numerous components, such as a user interface event (UIE) monitor 52, an outgoing packet (OP) monitor 54, configuration data 56, and an automatic tuning component 58. Also, in the example embodiment, filter driver 50 operates substantially independently of OS 46. However, alternative embodiments include implementations in which filter driver 50 operates more or less as part of the OS, implementations in which components that reside completely or substantially outside of filter driver 50 provide some or all of the functionality described below with respect to the subcomponents of filter driver 50, and implementations with other differences in the relationships of the operative software components. Similarly, in alternative embodiments, although the software component or components which provide the claimed functionality may be called a filter driver, those software components may not have the same privilege level and visibility to system events that a typical software driver has. In various embodiments, the filter driver could be implemented as any suitable program.

In one embodiment, filter driver 50 monitors keystroke and mouse events, and acts as a filter on all ports, or on specified ports, to prevent the transmission of packets that are not associated with recent user input events. For purposes of this disclosure, the term "packets" does not denote any particular format or structure of outbound data, but includes any type of data that is destined for a network port (or any similar port) of a processing system.

Figure 2:
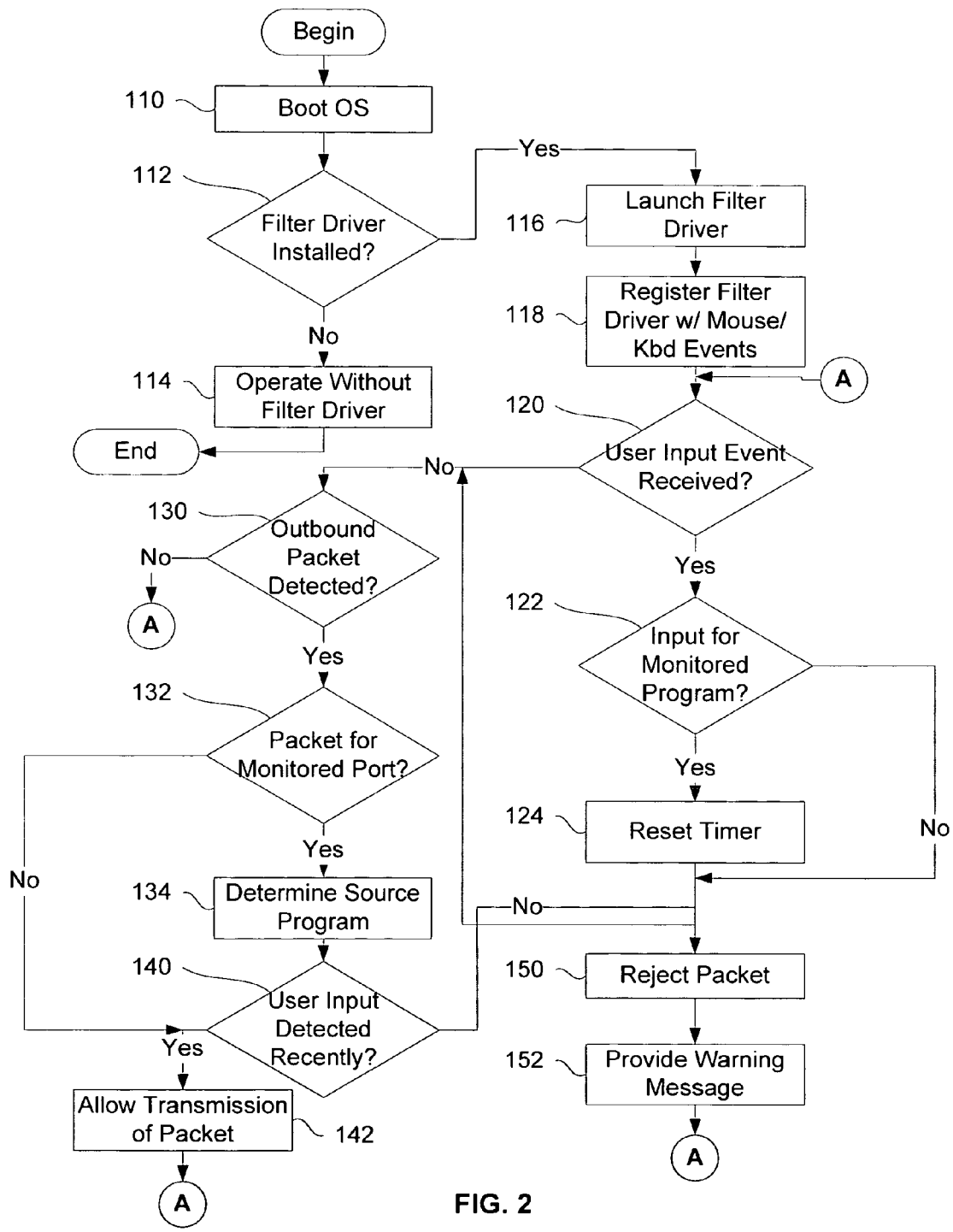
FIG. 2 presents a flowchart of an example embodiment of a method for controlling data propagation.

FIG. 2 presents a flowchart of an example embodiment of a method for controlling data propagation. The illustrated process begins with processing system 20 being started or restarted. At block 110, the booting of OS 46 is initiated. As indicated at block 112, as part of that boot process, or shortly thereafter, processing system 20 determines whether software such as filter driver 50 has been installed, for instance by reference to a registry of installed programs. If filter driver 50 has not been installed, processing system 20 finishes booting OS 46, if necessary, and processing system 20 proceeds to operate without the benefit of filter driver 50, as indicated at block 114.

However, if filter driver 50 has been installed, the process proceeds from block 112 to block 116, with processing system 20 launching filter driver 50. As described in greater detail below, configuration data 56 may contain settings for various operational parameters for filter driver 50. Alternatively or in addition, operational parameters may be stored outside of filter driver 50. In the example embodiment, in association with launching filter driver 50, processing system 20 may retrieve such operating parameters and configure filter driver 50 to perform in accordance with those parameters. Alternatively or in addition, after filter driver 50 is launched, it may modify its configuration, based on information contained in configuration data 56, information obtained from automatic tuner 58, and/or information obtain from other sources. For example, configuration data 56 may provide a list of applications for filter driver 50 to monitor for user input events and/or outgoing packets, a list of ports to monitor for outgoing packets, etc.

As indicated at block 118, when filter driver 50 is being launched, or shortly thereafter, filter driver 50 is registered with all appropriate input events, such as mouse and keyboard events, so that UIE monitor 52 will be notified whenever processing system 20 receives user input. Any suitable registration mechanism may be used, in accordance with the particular type of OS for any particular implementation. For instance, when an OS from the Microsoft® Windows® family is being used, the IoRegisterDeviceInterface routine may be used to register UIE monitor 52 as an interface to be called by the OS dispatcher.

As indicated at block 120, after filter driver 50 has been launched, it monitors processing system 20 for user input events. For example, whenever UIE monitor 52 receives notification of a user input event, it may pass information pertaining to the event to filter driver 50. In some embodiments, the information received by filter driver 50 identifies one or more attributes of the input, such as the type of input device used, the input received, the application in focus (e.g., the process identifier (PID) for the process that instantiated the event), the time the input event was generated, etc.

As indicated at block 122, in the example embodiment, after learning of a user input event, filter driver 50 determines whether the user entered the user input into one of the programs that filter driver 50 has been configured to monitor for user input (e.g., in accordance with configuration data 56). As indicated at block 124, if the user input was entered into one of those programs, filter driver 50 resets a timer for tracking the amount of time to pass after reception of the user input event. As described in greater detail below, the timer may subsequently be used to determine whether an outgoing packet was generated, or was likely to have been generated, by recent user input. Accordingly, the timer may be referred to as a delay interval timer.

In alternative embodiments, filter driver 50 may be designed or configured to reset the timer whenever any user input is received. Alternatively, multiple timers may be used to measure respective delay intervals for multiple programs.

As indicated at block 130, after filter driver 50 has determined whether a user input event has been received and possibly reset a delay interval timer, filter driver 50 may determine whether any outbound packets have been detected. For instance, OP monitor 54 may send information to filter driver 50 whenever it detects a request from any program to send data from processing system 20 to a remote processing system (e.g., an outgoing packet). Alternatively, OP monitor may only notify filter driver 50 about outgoing packets from particular programs and/or outgoing packets for particular ports (in accordance with configuration data 56, for example).

Although this disclosure describes communications between different software components in terms of sending and receiving information, it should be understood that those references are not limited to communications that are sent directly from one component to another, but include communications that use storage constructs such as global variables, shared memory, a common database, or any other appropriate mechanism to provide for communication between software components. Thus, for at least some contemplated embodiments, terms like "sending" and "retrieving" also cover operations like saving information into a database and retrieving information from the database.

In the example embodiment, when OP monitor 54 sends information about an outgoing packet to filter driver 50, filter driver 50 determines whether the packet is destined for a port that filter driver 50 is configured to monitor, as indicated at block 132. If the packet is not destined for a monitored port, filter driver 50 may allow processing system 20 to transmit the packet to a remote processing system, as indicated at block 142. However, if the packet is destined for a monitored port, filter driver 50 may use any suitable technique to determine which program in processing system 20 generated the packet, or caused the packet to be generated, as shown at block 134. Then, whether filter driver 50 uses a single, global delay interval timer or particular delay interval timers for particular programs, filter driver 50 consults the appropriate timer to determine whether the outbound network packet corresponds to a recent user input event, as indicated at block 140.

For instance, in the example embodiment, filter driver 50 stores a predetermined time interval that represents the maximum acceptable delay between when user input is received and when an outgoing packet is generated. For purposes of this disclosure, the predetermined time interval may be referred to as the maximum (max) interval. In one or more embodiments, the max interval may be hard-coded, it may be preconfigured in configuration data 56, it may be adjusted by a user or a local or remote administrator, and/or it may automatically be adjusted by automatic tuner 58, based on attributes of processing system 20 such as the speed of processor 22, the speed of NIC 32, etc. For instance, in one embodiment, processing system 20 provides setup options to allow users or administrators to select from various settings, including options for various predefined max intervals for filter driver 50, as well as an option for filter driver 50 to automatically set its own max interval based on input from automatic tuner 58. For example, one embodiment may allow filter driver 50 to be configured with a predefined max interval selected from a list including one or more of the following values: two seconds, one second, one half of a second, one tenth of a second, one millisecond, and two microseconds. Values for longer intervals, shorter intervals, and other intermediate intervals may be used in other embodiments. In one embodiment, automatic tuner 58 dynamically modifies the max interval, based on attributes of processing system 20 that may change over time.

If the outbound network packet follows the most recent user input event by less than the max interval, filter driver 50 may conclude that the outgoing packet corresponds to a recent user input event. Consequently, as indicated at block 142, filter driver 50 may allow processing system 20 to transmit the packet to a remote processing system, for instance by pushing the packet down the network stack to be handled. As indicated above, the determination of whether the delay interval exceeds the max interval may be based on a single timer or various timers for various programs. Thus, in one implementation, filter driver 50 may measure different delay intervals for each monitored program, with regard to the user input events and outgoing packets for each individual program being monitored. For example, filter driver 50 may compute the delay interval as the time interval between (a) when user input was directed to the software component that generated the outgoing network packet and (b) when the outbound network packet was generated. If the delay interval exceeds the max interval, filter driver 50 may conclude that the outbound network packet does not correspond to a recent user input event. Alternatively, a single timer may be used, and filter driver 50 may block all outgoing packets that are generated in processing system 20 after expiration of the max interval, until the timer is reset in response to new user input.

If filter driver 50 determines that the outgoing packet does not correspond to a recent user input even, filter driver 50 may reject the packet, as indicated at block 150. Filter driver 50 may also provide output to indicate that the packet was rejected, as indicated at block 152. Different types of output can be provided in different implementations, including processes which save a log in processing system 20 with pertinent info on the rejected packets, processes that provide a message to the user of processing system 20, and/or processes that send notification to a remote processing system. In alternative embodiments, instead of rejecting all packets with excess delay intervals, when filter driver 50 detects an outgoing packet with an excess delay interval, filter driver 50 may prompt the user to specify whether or not filter driver 50 should allow processing system 20 to transmit the packet despite the excess delay interval. If the user responds, filter driver 50 may reject the packet or not, in accordance with the user's response.

In the example embodiment, as indicated by connector A following blocks 152, 142, and 130, the process may return to block 120 after the packet has been either forwarded or rejected by filter driver 50, or after filter driver 50 has determined that no outgoing packets have been received. Filter driver 50 may then continue to monitor user input events and filter outgoing packets, as described above.

Any suitable timing mechanism may be used in various embodiments. For example, one embodiment may use the operation code (opcode) "rdtsc" to measure the delay interval, and another embodiment may use the "QueryPerformanceCounter" application programming interface (API). The example embodiment uses a delay interval timer that is reset to zero on each pertinent user input event and then incremented to measure the delay interval; however, other approaches to computing the delay interval can be used in other embodiment, such as approaches in which the current time or the current value of a steadily increasing counter is recorded on each user input event, or any other suitable approach.

In light of the principles and example embodiments described and illustrated herein, it will be recognized that the described embodiments can be modified in arrangement and detail without departing from such principles. Although the foregoing discussion has focused on particular embodiments, other configurations are contemplated as well. Even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. The hardware, software, or combinations of hardware and software for performing the operations of the invention may also be referred to as logic or control logic.

Similarly, in alternative embodiments, some or all of the software components could be partially or completely merged together or otherwise implemented differently. For example, one or more of the operations performed by one component in the example embodiment could be performed by a different component in an alternative embodiment. Similarly, one embodiment may use a layered driver model, in which the master filter driver performs operations based on information from UIE and OP monitors, while the UIE monitor performs operations based on information from keyboard and mouse drivers, and the OP monitor performs operations based on information from a NIC driver, for instance. Alternative embodiments may use fewer layers, for example with the filter driver receiving information directly from keyboard, mouse, and network drivers. Additional embodiments may use any other suitable software architecture for providing the functionality claimed below.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method comprising:
   automatically monitoring outbound network packets using a first monitor of a processing system;
   automatically monitoring user input events using a second monitor of the processing system;
   determining whether a user input was received by a program on a list of programs to be monitored;
   responsive to communication of first information to a filter driver, the first information including identification of a type of input device, the user input, and a program for which the user input was generated, automatically updating a delay interval timer in response to determining that the user input was received by at least one of the programs on the list;
   detecting an outbound network packet in the processing system by communication of second information to the filter driver, the second information including an indication of a port from which the outbound network packet is to be transmitted;
   in response to detecting the outbound network packet, automatically determining whether the outbound network packet corresponds to a recent user input event based on a comparison between the delay interval timer and a predetermined maximum time interval
   that represents a maximum acceptable delay between receipt of the recent user input event and generation of the outbound network packet; and
   if the outbound network packet does not correspond to the recent user input event, automatically preventing the processing system from transmitting the outbound network packet.

2. A method according to claim 1, wherein the outbound network packet is determined to correspond to the recent user input event if the outbound network packet follows the user input by less than the predetermined maximum time interval.

3. A method according to claim 1, further comprising:
   receiving a second user input pertaining to a maximum time interval setting for filtering outbound communications;
   in response to the second user input, storing the maximum time interval in the processing system as the predetermined maximum time interval; and
   determining that the outbound network packet does not correspond to the recent user input event if the outbound network packet follows a user input event by more than the predetermined maximum time interval setting.

4. A method according to claim 1, further comprising:
   using the delay interval timer to determine whether the outbound network packet corresponds to the recent user input event.

5. A method according to claim 1, further comprising:
   storing the predetermined maximum time interval for filtering outbound communications, wherein the predetermined maximum time interval represents an interval in the group consisting of:
   approximately two seconds;
   approximately one second;
   approximately one half of a second;
   approximately one tenth of a second;
   approximately one millisecond; and
   approximately two microseconds.

6. A method according to claim 1, further comprising:
   if the outbound network packet does not correspond to the recent user input event, automatically providing an output to indicate that transmission of the outbound network packet has been blocked.

7. A processing system comprising:
a hardware processor;
a machine-accessible storage medium responsive to the hardware processor; and
instructions in the machine-accessible storage medium, wherein the instructions, when executed by the processing system, cause the processing system to perform operations comprising:
determining whether a user input was received by a program on a list of programs to be monitored responsive to communication of first information to a filter driver, the first information including identification of a type of input device, the user input, and a program for which the user input was generated;
automatically updating a delay interval timer in response to determining that the user input was received by at least one of the programs on the list;
detecting an outbound network packet in the processing system by communication of second information to the filter driver, the second information including an indication of a port from which the outbound network packet is to be transmitted;
in response to detecting the outbound network packet, automatically determining whether the outbound network packet corresponds to a recent user input event based on a comparison between the delay interval timer and a predetermined maximum time interval setting; and
if the outbound network packet does not correspond to at least one recent user input event, automatically preventing the processing system from transmitting the outbound network packet.

8. A processing system according to claim 7, wherein the instructions cause the processing system to perform operations comprising:
determining that the outbound network packet corresponds to at least one recent user input event, if the delay interval timer is less than the predetermined maximum time interval setting.

9. A processing system according to claim 7, wherein the instructions cause the processing system to determine that the outbound network packet does not correspond to at least one recent user input event if the outbound network packet follows the user input by more than the predetermined maximum time interval setting.

10. A processing system according to claim 7, wherein the instructions cause the processing system to perform operations comprising:
storing the predetermined maximum time interval setting for filtering outbound communications, wherein the predetermined maximum time interval setting represents an interval in the group consisting of:
approximately two seconds;
approximately one second;
approximately one half of a second;
approximately one tenth of a second;
approximately one millisecond; and
approximately two microseconds.

11. A processing system according to claim 7, wherein the instructions cause the processing system to perform operations comprising:
if the outbound network packet does not correspond to the recent user input event, automatically providing an output to indicate that transmission of the outbound network packet was blocked.

12. An apparatus comprising:
a non-transitory machine accessible storage medium; and
instructions in the non-transitory machine accessible storage medium, wherein the instructions, when executed by a processing system, cause the processing system to perform operations comprising:
determining whether a user input was received by a program on a list of programs to be monitored responsive to communication of first information to a filter driver, the first information including identification of a type of input device, the user input, and a program for which the user input was generated;
automatically updating a delay interval timer in response to determining that the user input was received by at least one of the programs on the list;
detecting an outbound network packet in the processing system by communication of second information to the filter driver, the second information including an indication of a port from which the outbound network packet is to be transmitted;
in response to detecting the outbound network packet, automatically determining whether the outbound network packet corresponds to a recent user input event based on a comparison between the delay interval timer and a predetermined maximum time interval setting; and
if the outbound network packet does not correspond to at least one recent user input event, automatically preventing the processing system from transmitting the outbound network packet.

13. An apparatus according to claim 12, wherein the instructions cause the processing system to perform operations comprising:
determining that the outbound network packet corresponds to at least one recent user input event, if the delay interval timer is less than the predetermined maximum time interval.

14. An apparatus according to claim 12, wherein the processing system determines that the outbound network packet does not correspond to at least one recent user input event if the outbound network packet follows the user input by more than the predetermined maximum time interval.

15. An apparatus according to claim 12, wherein the instructions cause the processing system to perform operations comprising:
storing the predetermined maximum time interval setting for filtering outbound communications, wherein the predetermined maximum time interval setting represents an interval in the group consisting of:
approximately two seconds;
approximately one second;
approximately one half of a second;
approximately one tenth of a second;
approximately one millisecond; and
approximately two microseconds.

16. An apparatus according to claim 12, wherein the instructions cause the processing system to perform operations comprising:
if the outbound network packet does not correspond to the recent user input event, automatically providing output to indicate that transmission of the outbound network packet was blocked.

* * * * *